United States Patent [19]

Bohr

[11] 4,254,736

[45] Mar. 10, 1981

[54] ASSEMBLY LINE DAIRY BARN

[76] Inventor: Carl W. Bohr, R.R. #1, Ossian, Iowa 52161

[21] Appl. No.: 960,182

[22] Filed: Nov. 13, 1978

[51] Int. Cl.$^3$ .............................................. A01K 1/12
[52] U.S. Cl. .................................. 119/14.03; 119/16; 119/27
[58] Field of Search ..................... 119/14.03, 14.04, 16, 119/27

[56] References Cited

U.S. PATENT DOCUMENTS

| | | | |
|---|---|---|---|
| 2,236,851 | 4/1941 | Haselton | 119/27 X |
| 3,103,912 | 9/1963 | Benedetto | 119/14.04 |
| 3,261,323 | 7/1966 | Steelhammer | 119/14.04 |

Primary Examiner—Gene Mancene
Assistant Examiner—Robert P. Swiatek
Attorney, Agent, or Firm—Daniel Jay Tick

[57] ABSTRACT

A cylindrical structure has a central cylindrical hay storage area and a plurality of concentric circular paths therein around the hay storage area adjacent each other. Circular guide tracks are provided in at least one of the circular paths and extend therearound. A plurality of stanchions are mounted on the guide tracks for rotation around one of the paths for moving cows around such path to different areas thereof including washing areas wherein cows are washed, milking areas wherein cows are milked and feeding areas wherein cows are fed. The stanchions are rotated around the path.

3 Claims, 6 Drawing Figures

ASSEMBLY LINE DAIRY BARN

BACKGROUND OF THE INVENTION

The present invention relates to an assembly line dairy barn.

Milking a large number of cows involves considerable labor and the inability to care for each cow individually. Furthermore, the operator must do considerable walking, stooping and squatting in order to properly attend to the cows. There is little time for cleaning the cows or for providing a controlled environment.

The principal purpose of the invention is to provide an assembly line dairy barn of simple structure for milking a large number of cows with minimum labor and permitting care of each cow individually.

An object of the invention is to provide an assembly line dairy barn, which is inexpensive in manufacture and which avoids overexertion and orthopedic disabilities of the operator while permitting the proper milking and care of a large number of cows.

Another object of the invention is to provide an assembly line dairy barn which permits the proper milking of a large number of cows in a controlled environment.

Still another object of the invention is to provide an assembly line dairy barn which provides cleaning facilities for a large number of cows, moves the cows to the operator to be milked, and utilizes waste products of the cows for the production of useful items.

Another object of the invention is to provide an assembly line dairy barn of simple structure, which is inexpensive in manufacture, utilized with facility, convenience and rapidity, as well as comfort of the operator, and functions efficiently, effectively and reliably to provide proper milking facilities for a large number of cows in a controlled environment which provides the necessary feed supply and removal of waste products for useful purposes.

BRIEF SUMMARY OF THE INVENTION

In accordance with the invention, an assembly line dairy barn comprises a substantially cylindrical structure having a central cylindrical hay storage area and a plurality of concentric circular paths therein around the hay storage area adjacent each other. Circular guide tracks are provided in at least one of the circular paths and extend therearound. A plurality of stanchions are mounted on the guide tracks for rotation around the one of said paths for moving cows around the one of the paths to different areas of the path including washing areas wherein cows are washed, milking areas wherein cows are milked and feeding areas wherein cows are fed. A motive system is coupled to the stanchions for rotating the stanchions around the one of the paths.

A feed distribution system is provided in the structure for distributing feed to each of the stanchions. The feed distribution system includes overhead circular feed bins over an innermost path adjacent the hay storage area and over an outermost path farthest from the hay storage area. A plurality of feed bunks are each mounted on a corresponding one of the stanchions and move therewith. Access devices in the structure for supplying feed to the overhead feed bins and transfer devices transfer feed from the overhead feed bins to the feed bunks.

Paths adjacent each of the outermost and innermost paths have first and second circular guide tracks provided therein and extend therearound, respectively. A first plurality of the stanchions are mounted on the first guide track for rotation therearound. A second plurality of the stanchions are mounted on the second guide track for rotation therearound.

Paths adjacent the first and second circular guide path tracks are first and second walking paths, respectively, for cows and have spaced washing, milking and feeding areas thereon. Rubber matting covers the first and second walking paths for providing good footholds for cows.

Paths adjacent the first and second walking paths are first and second drain gutters, respectively, for collecting manure. A slurry tank is located outside the structure and spaced therefrom. Pipes couple the drain gutters to the slurry tank for directing manure from the gutters to the tank.

A path between the first and second drain gutters is an operator's walkway having pits formed therein in an area thereof between the milking areas of the first and second walking paths for enabling operators to milk cows while the operators are standing fully upright. Milk pipes from the milking areas to a milk tank supply milk from the cows to the milk tank.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
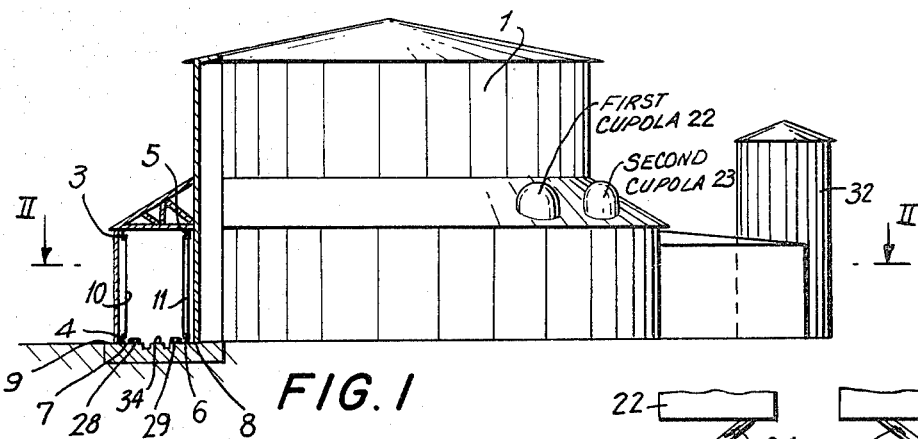
FIG. 1 is a view of an embodiment of the structure of the assembly line dairy barn of the invention.
Figure 2:
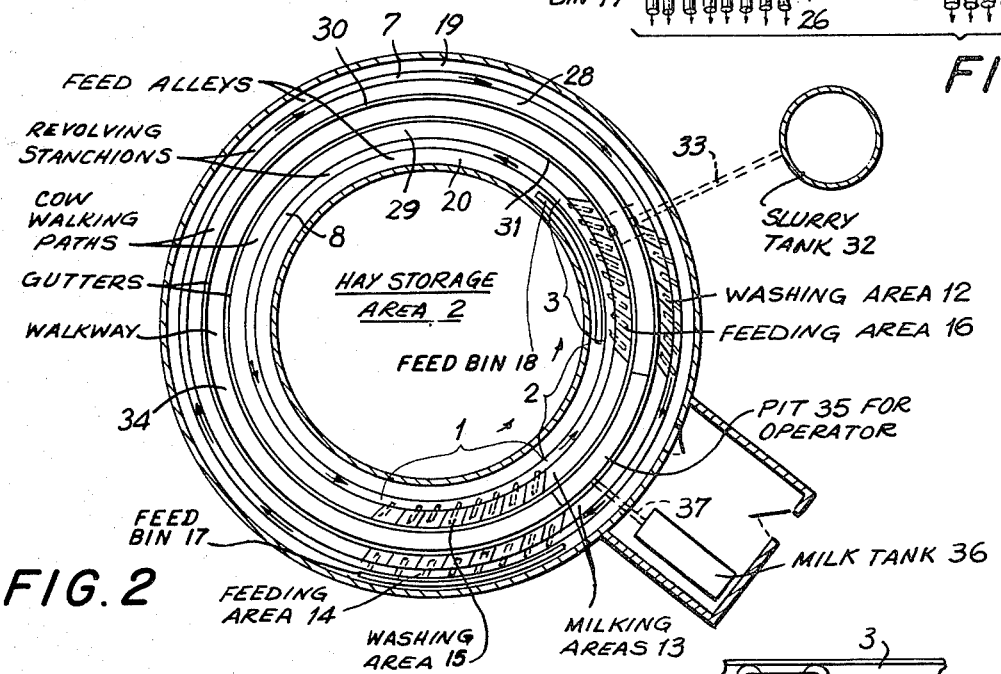
FIG. 2 is a cross-sectional view, taken along the lines II—II, of FIG. 1.
Figures 3, 4:
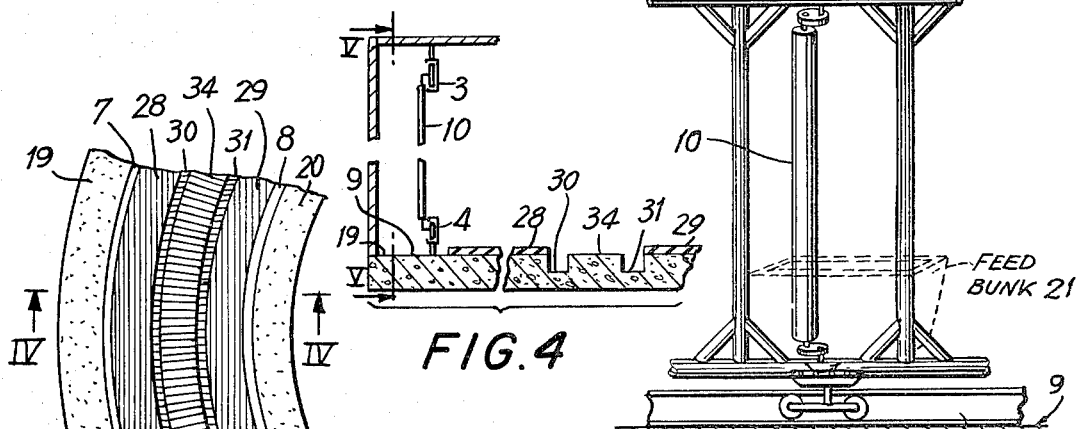
FIG. 3 is a view, on an enlarged scale, of part of the paths of the assembly line dairy barn of the invention.
FIG. 4 is a view, partly in section, on an enlarged scale, taken along the line IV—IV, of FIG. 3.

The assembly line dairy barn of the invention comprises a substantially cylindrical structure 1 (FIG. 1) having a central cylindrical hay storage area 2 (FIG. 2) and a plurality of concentric circular paths therein, around the hay storage area, adjacent each other, as shown in FIGS. 2 and 3.

Figure 5:
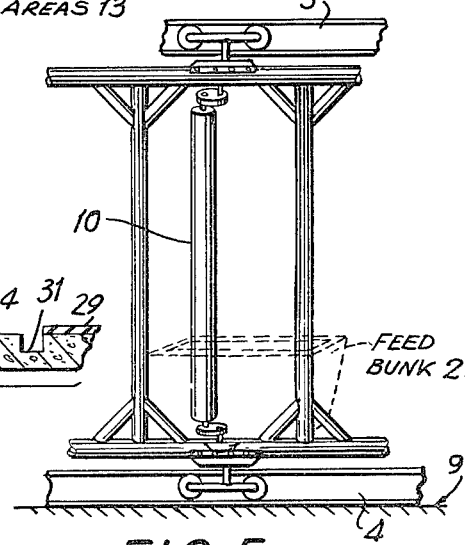
FIG. 5 is a view, on an enlarged scale, taken along the lines V—V, of FIG. 4.

Circular guide tracks 3 and 4, and 5 and 6 (FIG. 1) are provided in circular paths 7 and 8, respectively (FIGS. 2 and 3), and extend around said paths. The circular guide track 3 is provided at a predetermined height above the ground or floor level of the path 7 of the structure 1, as shown in FIGS. 1, 4 and 5, and the guide track 4 is provided on the ground or floor level 9 of the path 7 of said structure, as shown in FIGS. 1, 4 and 5. The circular guide track 5 is provided at a predetermined height above the ground or floor level 9 of the path 8 of the structure 1, as shown in FIG. 1, and the guide track 6 is provided on said ground or floor level of the path 8 of said structure, as shown in FIG. 1.

A first plurality of stanchions 10 (FIGS. 1, 4 and 5) are mounted on the guide tracks 3 and 4 for rotation around the path 7. A second plurality of stanchions 11 (FIG. 1) are mounted on the guide tracks 5 and 6 for rotation around the path 8. The first plurality of stanchions 10 thus moves cows around the path 7 and the second plurality of stanchions 11 moves cows around the path 8 to different areas of said path. The different areas of the path 7, as shown in FIG. 2, are a washing area 12 wherein cows are washed, a milking area 13 wherein the cows are milked and a feeding area 14 wherein the cows are fed. The different areas of the path 8, as shown in FIG. 2, are a washing area 15 wherein the cows are washed, the milking area 13 wherein the cows are milked and a feeding area 16 wherein the cows are fed.

As used herein, a stanchion is understood to be a device that fits loosely around a cow's neck and limits forward and backward motion, as in a stall.

A motive system is coupled to the stanchions 10 and to the stanchions 11 for rotating said stanchions around the paths 7 and 8, respectively. The motive system may comprise any suitable system for rotating the first plurality of stanchions 10 in, for example, a clockwise direction, indicated by the arrows in the path 7 of FIG. 2, and rotating the second plurality of stanchions 11 in a counterclockwise direction, indicated by the arrows in the path 8 of FIG. 2. Such a motive system may comprise an electric motor at each stanchion, coupled to the well-protected electrified overhead guide tracks 3 and 5, respectively, said guide tracks conducting electricity provided from a central power station.

The structure 1 includes a feed distribution system for distributing feed to each of the stanchions of the first and second pluralities of stanchions 10 and 11, respectively. The feed distribution system includes overhead circular feed bins 17 and 18, respectively, over the outermost and innermost paths 19 and 20, respectively (FIGS. 2 and 3). The path 19, as shown in FIGS. 2 and 3, is the outermost path, farthest from the hay storage area 2, whereas the path 20, as shown in FIGS. 2 and 3, is the innermost path, adjacent said hay storage area. As shown by broken lines in FIG. 5, a plurality of feed bunks are provided, each being mounted on a corresponding one of the stanchions and moving therewith. Thus, the feed bunk 21 is mounted on the stanchion of the first plurality of stanchions 10, as shown in FIG. 5, and moves therewith.

Figure 6:
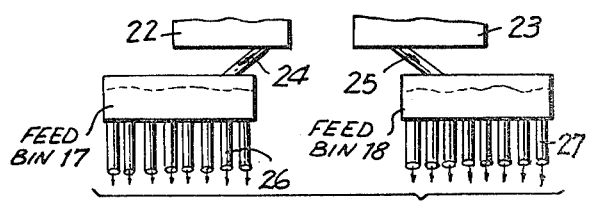
FIG. 6 is a schematic diagram of an embodiment of the feed distribution system of the assembly line dairy barn of the invention.

The feed distribution system further includes access facilities in the structure 1 for supplying feed to the overhead feed bins 17 and 18 and transfer facilities for transferring feed from the overhead feed bins to the feed bunks. The access facilities consist of first and second cupolas 22 and 23, respectively (FIGS. 1 and 6), formed in the structure, as shown in FIG. 1. The first cupola 22 supplies feed to the first overhead feed bin 17 via a first chute 24. The second cupola 23 supplies feed to the second overhead feed bin 18 via a second chute 25. The first feed bin 17 extends around the path 19 at a predetermined distance thereabove and has a plurality of first feed ducts 26 (FIG. 6) extending therefrom for transferring feed from said first feed bin to the feed bunks of the first plurality of stanchions 10. The second feed bin 18 extends around the path 20 at a predetermined distance above said path and has a plurality of second feed ducts 27 (FIG. 6) extending therefrom for transferring feed from said second feed bin to the feed bunks of the second plurality of stanchions 11.

The path 7, around which the first plurality of stanchions 10 rotate, is adjacent the outermost path 19, as shown in FIGS. 2 and 3. The path 8, around which the second plurality of stanchions 11 rotate, is next-adjacent the innermost path 20, as shown in FIGS. 2 and 3.

First and second walking paths 28 and 29 for cows are provided adjacent the first and second circular guide path tracks 7 and 8, respectively, as shown in FIGS. 1 to 4. The first and second cow walking paths 28 and 29 have the spaced washing, feeding and milking areas thereon. Thus, the first cow walking path 28 extends through the washing area 12, the milking area 13 and the feeding area 14 and the second cow walking path 29 extends through the washing area 15, the milking area 13 and the feeding area 16, as shown in FIG. 2. Rubber matting, illustrated in FIGS. 1 and 4, covers the first and second cow walking paths 28 and 29 for providing good footholds for the cows.

Paths 30 and 31 adjacent the first and second walking paths 28 and 29, respectively (FIGS. 2 to 4), are first and second drain gutters, respectively. The first and second drain gutters 30 and 31 collect manure. A slurry tank 32 (FIGS. 1 and 2) is provided outside the structure 1 and is spaced from said structure. Pipes 33 (FIG. 2) couple the drain gutters 30 and 31 to the slurry tank 32 for directing manure from said gutters to said tank. The collected manure is converted, by separate process, to methane gas and fertilizer, whereby the operator is provided with the basic materials for continued operation.

A path 34 extends between the first and second drain gutters 30 and 31, as shown in FIGS. 1 to 4, and functions as an operator's walkway. A pit 35 (FIG. 2) is formed in the operator's walkway 34 in an area of said walkway between the milking areas 13 of the first and second cow walking paths 28 and 29 and enables an operator or operators to milk the cows while the operators are standing fully upright. A milk tank 36 is provided and milk pipes 37 extend from the milking areas 13 to the milk tank 36, as shown in FIG 2, for supplying milk from the cows to said milk tank.

While the invention has been described by means of a specific example and in a specific embodiment, I do not wish to be limited thereto, for obvious modifications will occur to those skilled in the art without departing from the spirit and scope of the invention.

I claim:

1. An assembly line dairy barn, comprising
a substantially cylindrical structure having a central cylindrical hay storage area and a plurality of concentric circular paths therein around the hay storage area adjacent each other;
circular guide tracks provided in at least one of the circular paths and extending therearound;
a plurality of stanchions mounted on the guide tracks for rotation around said one of said paths for moving cows around said one of said paths to different areas of said path including washing areas wherein cows are washed, milking areas wherein cows are milked and feeding areas wherein cows are fed;
motive means coupled to the stanchions for rotating said stanchions around said one of said paths;
a feed distribution system in said structure for distributing feed to each of said stanchions, said feed distribution system including overhead circular feed bins over an innermost path adjacent the hay storage area and over an outermost path farthest from the hay storage area, a plurality of feed bunks each mounted on a corresponding one of said stanchions and moving therewith, access means in the structure for supplying feed to the overhead feed bins and transfer means for transferring feed from said overhead feed bins to the feed bunks, paths adjacent each of the outermost and innermost paths having first and second circular guide tracks provided therein and extending therearound, respectively, a first plurality of said stanchions being mounted on the first guide track for rotation therearound and a second plurality of said stanchions being mounted on the second guide track for rotation therearound, paths adjacent the first and second circular guide path tracks being first and second walking paths, respectively, for cows and having spaced washing, milking and feeding areas thereon; and rubber matting covering said first and second walking paths for providing good footholds for cows.

2. An assembly line dairy barn as claimed in claim 1, wherein paths adjacent the first and second walking paths are first and second drain gutters, respectively, for collecting manure, and further comprising a slurry tank outside the structure and spaced therefrom and pipe means coupling the drain gutters to the slurry tank for directing manure from the gutters to the tank.

3. An assembly line dairy barn as claimed in claim 2, wherein a path between the first and second drain gutters is an operator's walkway having a pit formed therein in an area thereof between the milking areas of the first and second walking paths for enabling operators to milk cows while the operators are standing fully upright, and further comprising a milk tank and a milk pipe means from the milking areas to the milk tank for supplying milk from the cows to said milk tank.

* * * * *